SIGNALLING UNIT FOR ELECTRONIC TELEPHONE SYSTEMS

Filed May 22, 1961 4 Sheets-Sheet 1

INVENTOR
NILS HERBERT EDSTRÖM
BY Hane and Nydick
ATTORNEYS

May 25, 1965 N. H. EDSTRÖM 3,185,772

SIGNALLING UNIT FOR ELECTRONIC TELEPHONE SYSTEMS

Filed May 22, 1961 4 Sheets-Sheet 2

INVENTOR
NILS HERBERT EDSTRÖM
BY Hane and Nydick
ATTORNEYS

May 25, 1965 N. H. EDSTRÖM 3,185,772

SIGNALLING UNIT FOR ELECTRONIC TELEPHONE SYSTEMS

Filed May 22, 1961 4 Sheets-Sheet 3

INVENTOR
NILS HERBERT EDSTRÖM
BY Hane and Nydick
ATTORNEYS

May 25, 1965 N. H. EDSTRÖM 3,185,772

SIGNALLING UNIT FOR ELECTRONIC TELEPHONE SYSTEMS

Filed May 22, 1961 4 Sheets-Sheet 4

INVENTOR
NILS HERBERT EDSTRÖM
BY Hane and Nydick
ATTORNEYS

3,185,772
SIGNALLING UNIT FOR ELECTRONIC TELEPHONE SYSTEMS

Nils Herbert Edström, Hagersten, Sweden, assignor to Telefonaktiebolaget L M Ericsson, Stockholm, Sweden, a corporation of Sweden Filed May 22, 1961, Ser. No. 111,538
Claims priority, application Sweden, Mar. 8, 1961, 2,434/61
1 Claim. (Cl. 179—18)

The present invention refers to a signalling unit for receiving and sending digit signals in an electronic telephone system of time division multiplex type, more precisely to a circuit arrangement allowing a simple and effective marking of the idle or the busy condition of the signalling unit.

A signalling unit of said type co-operates with a memory group arranged in a register memory, in such a way that each of the signalling units is scanned cyclically simultaneously with its own memory group, by means of pulses in definite register pulse positions in order to write in received digit signals in the memory group and/or to send records recorded in said memory group, during the respective register pulse position. Each of the signalling units has an individual contact which is periodically closed by means of contact driving pulses simultaneously with an individual contact belonging to means (subscriber, register) with which a speech connection has to be established in a speech pulse position selected for said connection. The idle or busy condition of the signalling unit is marked by the potential condition of a test wire.

The means producing the potential depending on the condition has to be brought from idle-marking condition to busy-marking condition and vice versa which on one hand implies a certain delay relatively to the momentary condition, on the other hand implies that a possibility exists of obtaining erroneous state indications when faults occur in said means.

In order to eliminate said drawbacks according to the present invention the contact driving pulses which seize and hold the signalling unit are used for producing the busy-marking potential.

The multiplex telephone system according to the invention is substantially characterized by the fact that it comprises an integrating circuit which produces an idle-marking potential on the test wire as long as it is fed by the register pulse position pulses, and an inhibiting circuit which is connected to a source producing said contact driving pulses and depending upon whether it obtains said pulses blocks the idle-marking potential of the test wire. The inhibiting circuit is also connected to each of the circuits which constitute part of the signalling unit and which circuits can be in either a rest- or working condition, to block the idle-marking potential of the test wire also when one of said circuits is not restored to its condition of rest. The system further comprises a restoring circuit which during each register pulse position when the signalling unit is not busy restores all the circuits to rest position and is adapted to be affected by said contact driving pulses so that upon receiving said pulses the restoring will cease.

Figure 1A:
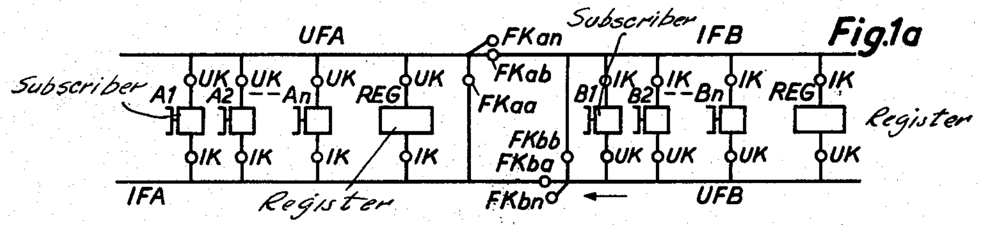
Figure 1B:
Figure 2B:
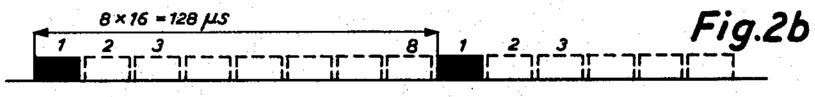
Figure 2A:
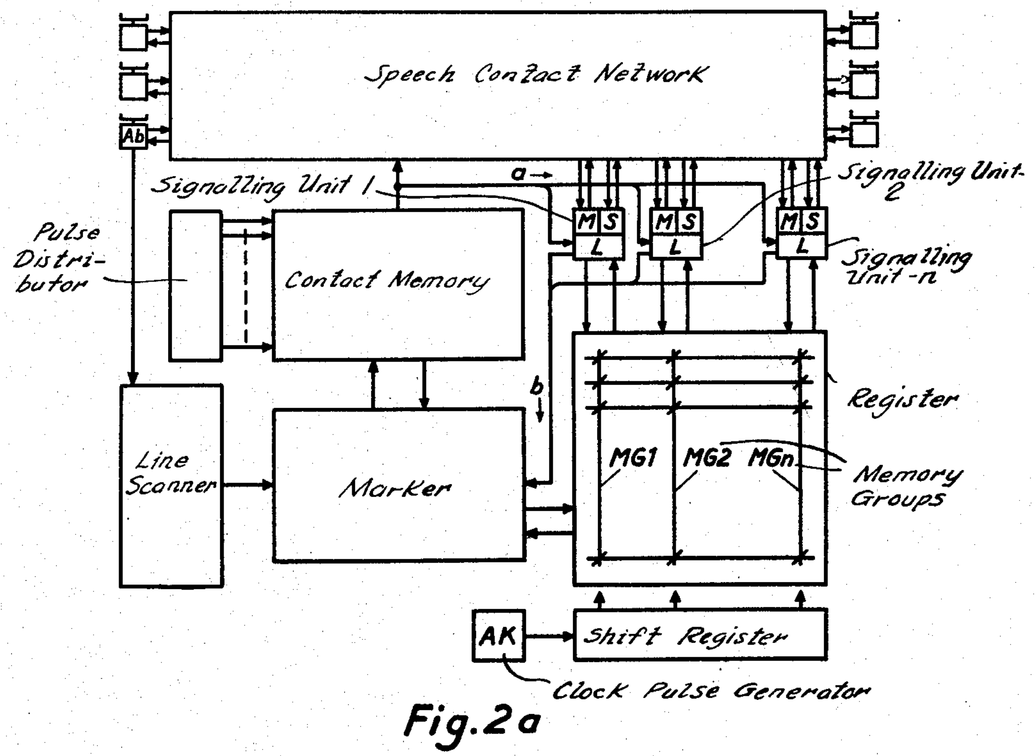
Figure 3:
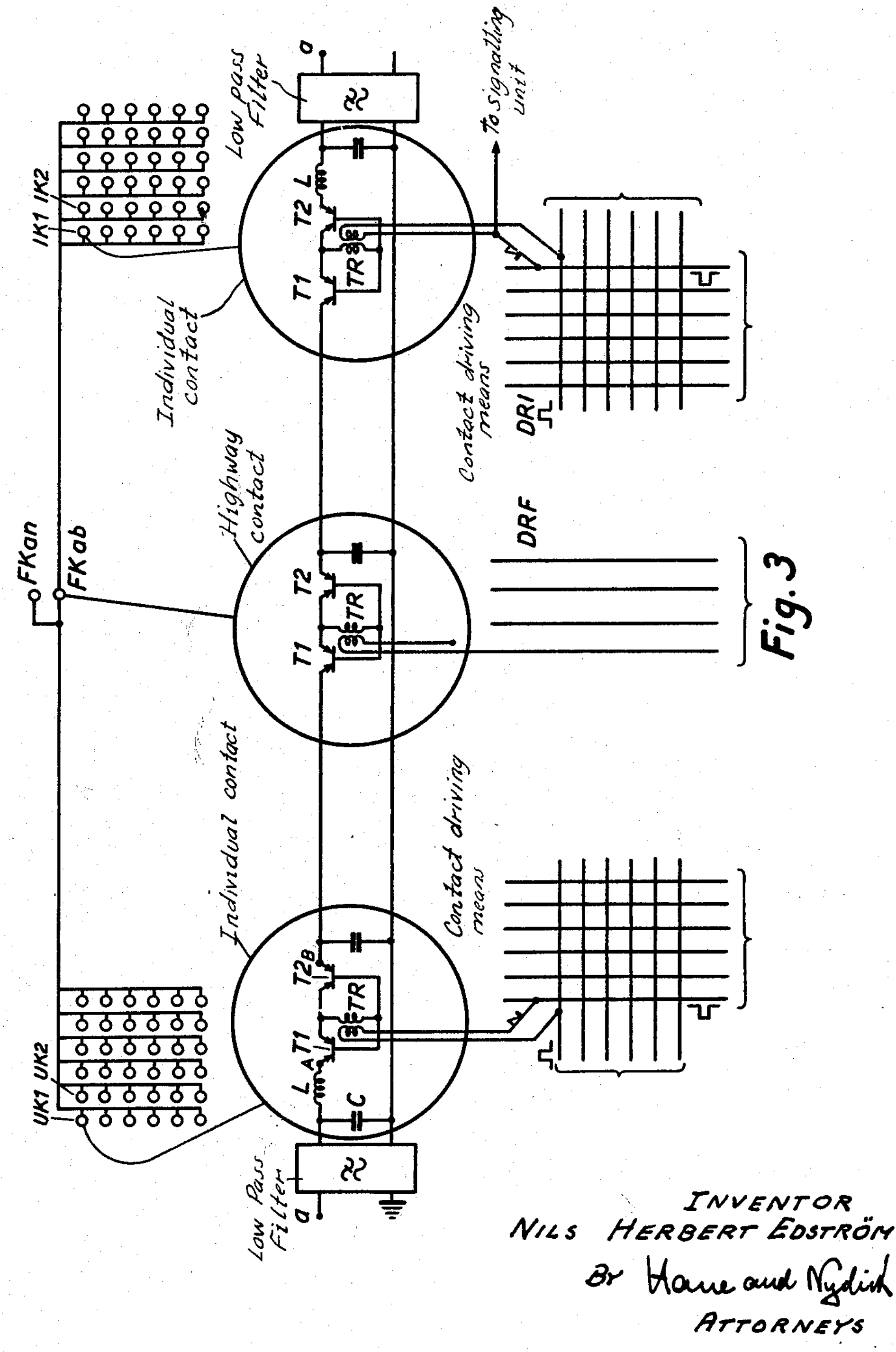
Figure 4:
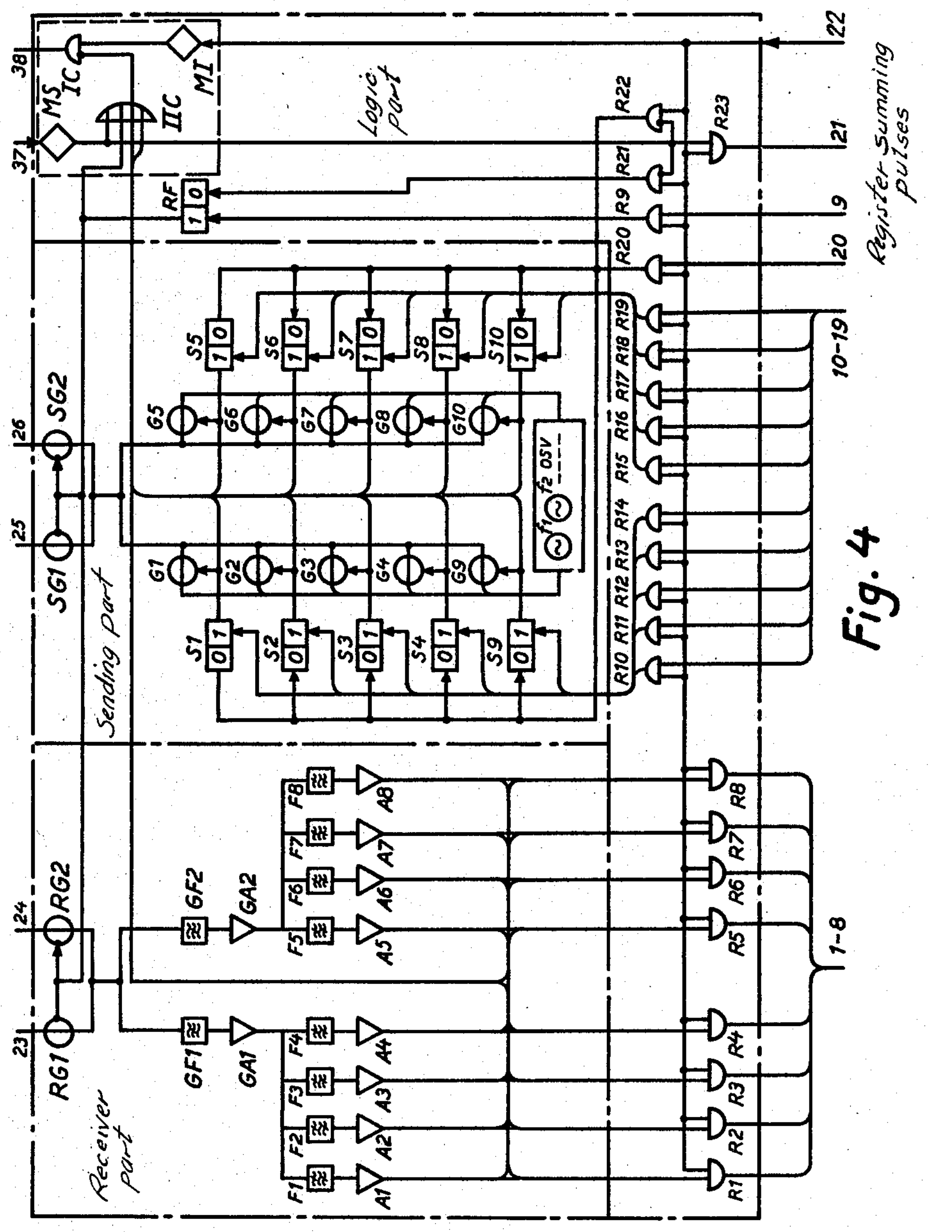
Figure 5:
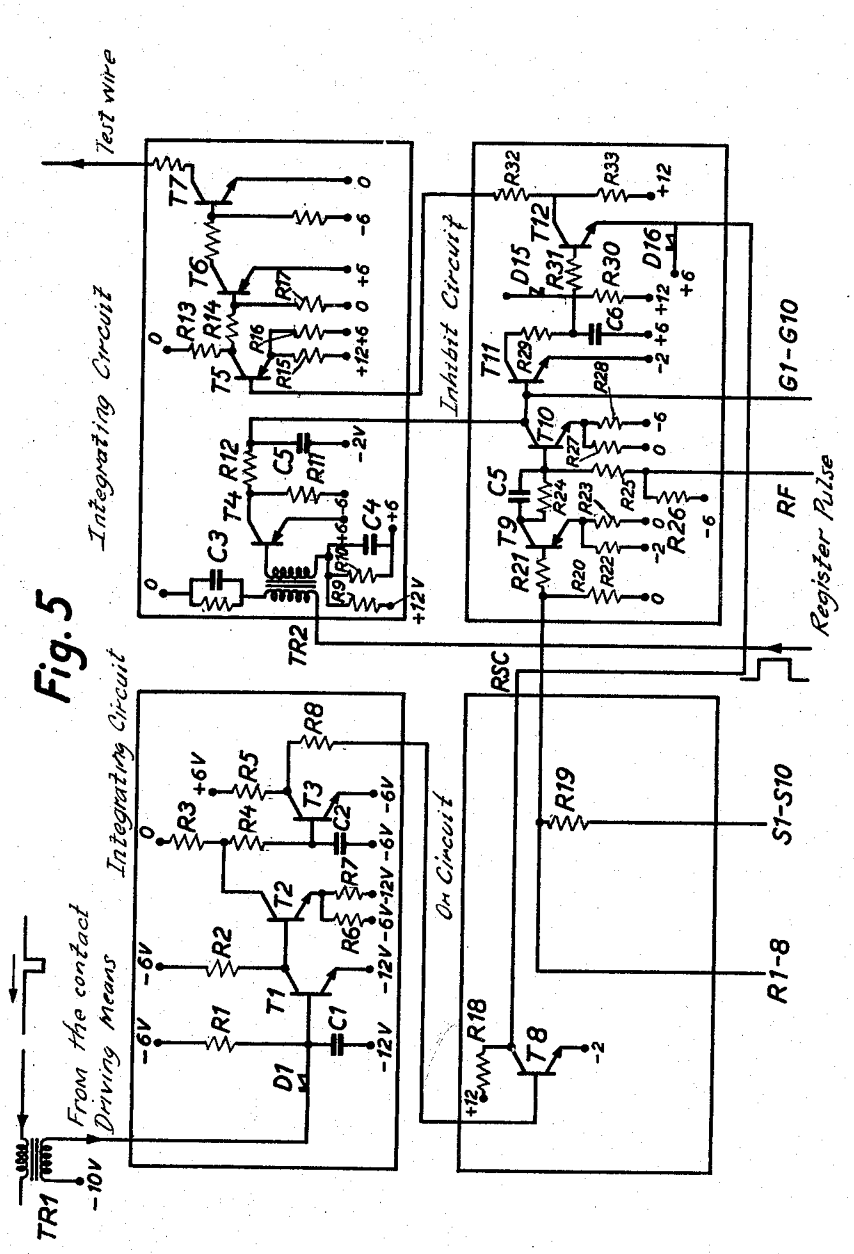

The invention will be described more in detail by means of an embodiment with reference to the enclosed drawing. FIG. 1*a* shows diagrammatically a number of subscribers and a number of registers. FIG. 1*b* shows diagrammatically speech pulse positions in which a connection can be established between two subscribers or a subscriber and a register. FIG. 2*a* shows a block diagram of an electronic telephone system. FIG. 2*b* shows the register pulse positions in which the different registers, i.e. the signalling units are active. FIG. 3 shows a connection extending between the individual contacts of two subscribers or the individual contacts of a subscriber and a register through a path contact, the contacts being shown on a longer scale. FIG. 4 is a logic diagram of a signalling unit according to the invention. FIG. 5 shows finally a circuit diagram of the circuit arrangement which in the signalling unit causes idle- or busy-marking.

FIG. 1*a* shows two groups of subscribers A1–A*n*, B1–B*n* which each through its outgoing speech contact or individual contact UK can be connected to a common outgoing conductor or path UFA, UFB and each through its incoming speech contact or individual contact IK can be connected to a common incoming conductor IFA, IFB. The two paths are called pairs of paths. The telephone exchange comprises a number of pairs of paths each having its group of subscribers, the outgoing path of each pair of paths being connectable to the incoming path of each other pair of paths through path contacts FK and to its own incoming path. Also registers REG can be connected to the pairs of paths in the same manner as the subscribers through their individual contacts UK or IK and the connection between a subscriber and a register is established in the same way as between two subscribers. Closing of both the individual and contacts in paths is carried out by means of periodically repeated pulses in a pulse position selected among a number of pulse positions, for example 20. When for example the duration of a pulse position is 4 $\mu$s a selected contact will be closed each 80 $\mu$s as shown in FIG. 1*b*. In order to establish a two-way connection between two subscribers and a subscriber and a register, for example A1 and REG1 which belong to the same group or pair of paths it is necessary to make us of two pulse positions, for example position 2 and 3 in FIG. 1*b* as the same common conductors have to be used in both speech directions through the contact FK*aa* which in this case of course, has to be closed in both pulse positions. If two subscribers belonging to different pairs of paths have to be connected with each other, it will be sufficient to have one pulse position as two outgoing and two incoming paths are simultaneously in operation. The speech connection is maintained as long as the individual contacts and the path contacts are influenced in the pertinent pulse position.

FIG. 2*a* is a block diagram of an electronic telephone system in which any two subscribers can be connected with each other or a calling subscriber can be connected with a register. A speech contact network TK comprises a number of individual contacts and path contacts according to FIG. 1*a*. The contacts are actuated by means of periodical pulses which are obtained from a contact memory KM in the form of a code. The contact memory consists of a number of magnetic cores which when brought from rest position to working position by switching will represent a a record in the form of a code. A pulse distributor PD feeds read pulses to the contact memory in said 20 pulse positions in turn and the contact memory will send pulses to the speech contact network TK in accordance with the code stored in the magnetic cores as obtained when the latter are switched by the read pulses so that the contact corresponding to the code is affected in the pertinent pulse position in a manner known per se. The information referring to the contacts which are to be closed or the closing of which should cease is written respectively erased by the marker M. The purpose of the marker is to determine the multiple position and the cradle contact condition of the subscribers by means of a line scanner LA and to select a common idle pulse position or idle pulse positions for the calling subscriber and for an idle register or for the calling and the called subscriber respectively and to write the number of the contacts into the contact memory in the respective pulse position. The registers comprise memory groups MG1–MG*n* in a register memory RSM which groups are controlled by common means. These registers receive the digit signals by means of voice frequency signals through its signalling unit SE1–SE$n$ and the digit signals received are recorded in the registers or memory groups in code form by switching of magnetic cores. To each of the memory groups pertains a register pulse position in which the respective memory group and the signalling unit belonging to it are activated. According to the example there are 8 register pulse positions each having a duration of 16 $\mu$s. so that the same memory unit is scanned each 128th $\mu$s. as shown in FIG. 2$b$. As it appears the register pulse positions are quite different from the speech pulse positions although the same clock pulse generator AK which generates the speech pulses is used for generating the register pulses in such a manner that according to the present example 4 clock pulses are added in order to obtain a register pulse. By AS is indicated a shift register which in the respective register pulse positions feeds a register pulse to the respective memory unit and the signalling unit belonging to it, in order to activate the same so that during said scanning pulse digit signals can be received and recorded in the memory group, and the records, after a possible change, can be read out and erased in the memory group. The signalling units SE consist of a receiving part M, a sending part S and a logic part L which controls the two before mentioned parts by means of the information received from the register (memory group). In cases where the register establishes a transit connection one incoming contact IK and one outgoing contact UK are necessary in both directions as is easy to see, so that a connection can be set up through four conductors through the register. As should be clear REG in FIG. 1 is intended to represent a memory group MG which according to the example together with the other 7 units constitutes the whole register memory. As will be explained more in detail the logic part L of the signalling unit is influenced by the driving pulses ($a$) of the speech contact network and the logic part signals to the marker busy or idler condition ($b$). The function of the line scanner LA, of the marker M, of the contact memory KM and the register memory RSM is not described in detail as this is not necessary in order to elucidate the function of the signalling unit or the principle of the invention.

FIG. 3 shows a two-conductor connecting path from the individual contact UK of the subscriber to the individual contact IK of the register receiver through a contact FK. A corresponding connecting path extends from the outgoing individual contact of the receiver to the incoming individual contact of the subscriber. Said last mentioned connecting path is not shown as it has no importance from the point of view of the invention. In the upper part of FIG. 3 are shown on one hand 36 individual contacts UK which can be connected to an outgoing path, on the other hand 36 individual contacts IK which can be connected to an incoming path, furthermore path contacts FK which can connect an outgoing path with one of the incoming paths. One contact in each contact group is shown more in detail. One speech wire $a$ of the subscriber is through a low pass filter LP and an inductance L connected to an individual contact UK. The other speech wire $b$ of the subscriber is in a similar way connected to the incoming speech wire (not shown). A shunt capacitor C which is the last link in the low pass filter forms together with the inductance L an oscillating circuit, a connection between two subscribers or between a subscriber and a register respectively being obtained thereby that the charges stored in the capacitors of the respective subscribers change places with each other during the time their individual contacts close a connection through a common conductor in a manner known per se. The individual contacts and the path contacts consist of electronic switches having two transistors T1 and T2, the emitter-collector circuits of which are connected in series between the points A and B in the transmitting circuit. The control circuit is connected between the emitters and bases mutually connected in parallel. When obtaining a pulse through the pulse transformers TR the transistors are deblocked and a current can pass between A and B. The driving means DRU, DRF and DRI are shown as a system of conductors to which pulses are supplied according to the code written in the contact memory. As is made clear from the drawing one individual contact belongs to each cross-point. By feeding a pulse to two crossing conductors simultaneously the individual contact belonging to the intersection point obtains a pulse in a manner known per se.

FIG. 4 is a logic circuit of a signalling unit used for digit receiving and sending, and to which unit the principle of the invention has been applied. The receiver part M is intended to receive digit signals from a calling subscriber or from the register in the preceding exchange, in the form of a voice frequency code. According to the example 1 of 4 plus 1 of 4 voice frequencies are used which influence corresponding receivers F1–F4 respectively F5–F8 each having its amplifier A1–A4 respectively A5–A8. Two group filters are designated by GF1 and GF2. These exclude frequencies from the other group and each has its level regulating amplifier GA1 respectively GA2. The voice frequency signals are obtained from the line through the wire 23 and the gate RG1 in the case of a call from a subscriber or a preceding exchange and through the wire 24 and the gate RG2 in the case of transit traffic to a subsequent exchange. The signals received produce a potential on the conductor belonging to the respective receiver and said potential is supplied to the register memory through the wires 1–8 in order to obtain a record in the register memory RSM. This can only be carried out in the register pulse position belonging to the respective signalling unit when the signalling unit is scanned through the wire 22 (compare FIG. 2$b$). The wires 1–8 extend through and-circuits R1–R8, the other functioning condition of which is that they obtain a pulse from the wire 22.

The sending part comprises according to the example 10 voice frequency sources $f1$–$f10$ of which 8 in a suitable code combination can be connected to the outgoing line in order to send digit signals from the register in question to a register in a subsequent exchange and the two further frequencies are intended to give a register tone respectively to give a calling tone during the signalling in the direction of the subsequent register. Connection of the voice frequency signals to the incoming or outgoing line respectively is carried out by means of gates G1–G10 which are opened or closed by means of bistable switches S1–S10. The switches are operated in accordance with the code signals obtained from the register memory through the wires 10–19 which code signals are determined by for example the digits recorded in the register memory or by the fact that for example the first digit has been received and the register tone should cease and so on. Said wires extend through and-circuits R10–R19 the other functioning condition of which is that they obtain the register scanning pulse from the wire 22. The signals to the subscriber respectively to the preceding exchange are sent through wire 25 and gate SG1 and to the subsequent exchange through wire 26 and gate SG2.

Idle and busy condition signalling from the signalling unit is carried out through the test wire 38 in the direction of the marker according to the example in such manner that the wire in idle condition may conduct due to the fact that the wire, for example through a conducting transistor, is connected to a defined potential while the wire in busy condition cannot conduct as it is interrupted due to the blocking condition of said transistor. The register scanning pulses from wire 22 influence an integrating circuit MI which in the idle condition of the signalling unit maintains the test wire in said conducting condition. The above can be considered to be known per se. According to the invention the busy-signalling is controlled by the same means which cause seizing of the signalling means, i.e. the contact driving device DR1 which feeds closing pulses to the individual contack IK of the signalling unit (FIG. 3). Said pulse is conducted through the wire 37 to an integrating circuit MS which, as long as it obtains the driving pulses from the contact driving device, supplies a potential to an and-circuit R23 the other functioning condition of which is that it obtains a register scanning pulse through the wire 22. From the and-circuit R23 pulses are consequently fed through wire 21 to a memory group in the register memory and hold the latter as long as the contact driving pulses are obtained through the wire 37. According to the invention the potential obtained from the integrating circuit MS constitutes an inhibiting condition for the circuit TC which controls the idle- or busy-marking of the signalling unit, through the wire 38 in the direction of the marker. Consequently no special means in the signalling circuit will be necessary which at first have to be brought to busy-signalling condition and thereafter restored to idle-signalling condition, but as soon as the holding signal ceases due to the cessation of the contact drive pulses, the busy-signal will also cease automatically. An or-circuit which is connected between the output of the integrating circuit MS and the inhibiting circuit IC is designated by IIC. According to the invention said or-circuit inhibits the last mentioned output. This also depends on other conditions, more precisely whether all the circuits in the signalling unit are brought to zero. In FIG. 4 it is shown symbolically that the circuit IC can also be inhibited due to the fact that the voice frequency receivers and the and-circuits R1–R8 belonging to them are restored to zero-condition or because the gate circuits G1–G10 and the switches S1–S10 are restored to 0-condition, furthermore because the gates RG1, SG1 are opened and the gates RG2, SG2 are closed. The two first-mentioned gates control the connection from and to the subscriber or the preceding exchange and the two last-mentioned gates control the connection to or from the subsequent exchange in the case of a transit call. Switching is carried out by means of a switch RF which is controlled by means of the digit records written in the register memory through the wire 9. The switch RF has consequently to be set to zero in order to allow idle-marking of the signalling unit in outward direction as the 1-condition of the switch inhibits the circuit IC through the or-circuit IIC. It is of course possible to render the idle-marking dependent on the zero-setting of other circuits, the zero-setting of which is necessary in order to allow the signalling unit to correspond to the idle condition. Furthermore the signalling unit comprises two inhibiting circuits R21 and R22 which are activated during each register scanning pulse and supply a zero-setting pulse to all the circuits. When the signalling unit is busy and the output of the integrating circuit MS obtains an input potential, the circuits R21, R22 are inhibited so that the register scanning pulse cannot restore the circuits to 0-condition. If however any of the circuits should not be restored when the unit is released by the marker, the next register scanning pulse will restore all the circuits to 0-condition so that the inhibition of the circuit IC will cease and the signalling unit will be idle-marked.

In FIG. 5 there is shown a circuit diagram of the circuits MS, MI, IC and IIC in FIG. 4. The test wire 38 which in the direction of the marker indicates the idle or busy condition of the signalling unit is connected to the collector of the transistor T7 in the circuit MI. When the signalling unit is idle, the transistor T7 will be conducting and consequently the test wire has the same potential as the emitter, i.e. 0-potential. If, on the other hand, the signalling unit is busy and the transistor is blocked, the test wire is interrupted and consequently it is not connected to any potential source. As has been mentioned in connection with FIG. 4, the signalling unit is marked as busy in consequence of the fact that it is engaged by the marker by means of the same contact driving pulses which close the individual contacts IK of the signalling unit, i.e. of the register (FIG. 3). The pulses are fed through a pulse transformer TR1 to the integrating circuit MS in FIG. 5. When no pulses are obtained from the transformer, the transistor T1 will be conducting which implies that the transistor T2 is blocked as its base has the same potential as the emitter of the transistor T1. The transistor T3 is conducting as its base potential is near zero, so that the transistor T8 in IIC is blocked as its base has the same potential as the emitter of the transistor T3. When the transistor T8 is blocked, its collector has +12 v. potential, so that a current may pass through the diode D16 thereby causing the emitter of transistor T12 to attain a +6 v. potential. The transistor T12 is blocked if register scanning pulses are obtained through the transformer TR2. In this case the transistor T4 is conducting and the transistor T11 in IC has the same base potential as the emitter potential in T4, i.e. +6 v. The transistor T11 will be conducting which causes the base of transistor T12 to attain the same potential as the emitter of transistor T11 (−2 v.) so that transistor T12 is blocked. Now transistor T5 is also blocked, as its base obtains +12 v. through the resistance R33. In the blocked state of transistor T5 transistor T6 is conducting as its base is connected to 0-potential and also transistor T7 is conducting. The test wire which is connected to the collector has consequently the same potential as the emitter, i.e. 0 which indicates the idle condition of the signalling unit. As mentioned before the idle-marking on the test wire ceases as soon as driving pulses begin to be fed to the individual contact of the signaling unit. The transformer TR1 senses these driving pulses which are negative relatively to the rest potential −10 v. of the secondary winding, so that the base of the transistor T1 reaches a lower potential than −12 and the capacitor C1 is charged. As long as the charging of the capacitor continues, the transistor T1 is maintained blocked which implies integration of the pulse obtained. By the blocking of the transistor T1 the potential of the base is increased in the transistor T2 so that the latter will be conducting and will cause amplification of the pulse obtained by the discharge of the capacitor. The base of the transistor T3 obtains the same potential as the emitter of T2 and is blocked simultaneously as the capacitor C2 is charged. The capacitor is selected in such a way that upon the cessation of the pulse it has sufficient energy for maintaining the transistor T3 blocked until the next pulse has been obtained so that the base of the transistor T8 obtains a direct potential from the emitter in T3 which potential maintains the transistor T8 in the conducting state during the whole time during which driving pulses are obtained. In consequence of this the emitter of the transistor T12 obtains a potential of −2 v. and is deblocked. The same potential is now applied to the base of transistor T5 so that also this transistor will be conducting. The base of transistor T6 now obtains the emitter potential of T5 so that the transistor T6 will be blocked and consequently also the transistor T7 will be blocked, the base potential of the latter will be −6 v. The 0-potential is consequently disconnected from the test wire which implies that busy condition is marked.

If the register scanning pulses through the transformer TR2 should cease, the transistor T4 will be blocked which consequently also blocks the transistor T11. Due to this the base potential of transistor T12 is increased, so that the transistor is deblocked. Thus if no driving pulses for engaging the signalling unit should have been received but the register scanning pulses cease owing to for example interruption, the consequence from the point of view of the test wire will be the same as in the preceding case. The difference will be that the emitter of the transistor T12 instead of −2 v. obtains + 6 v. which is sufficient for rendering transistor T5 conducting and in consequence the transistors T6 and T7 are blocked and the test wire will be without potential which implies busy-marking.

The condition of the transistor T12 and consequently also the condition of the test wire are also dependent on the fact that all the circuits are set to 0. The outputs of the gates G1–10 are connected to the base of the transistor T11 and block said transistor by means of a potential that is lower than −2 v. In the same manner the transistor T11 will be blocked if the outputs of the receivers R1–R8 and the senders S1–10 open the transistors T9, T10 which normally are blocked. The output of the switch RF is directly connected to the base of the transistor T10.

The invention is of course not limited to the embodiment shown.

Both the potentials used and the circuits, on the function of which the busy-marking depends, can be selected in any suitable way and the potential of the test wire for marking the busy or idle condition can be freely selected.

I claim:

In an electronic time division multiplex telephone system including groups of memory storage means for storing digit signals, each of said memory storage means being scanned in its pulse position in which write-in and read-out digit signals may be effected while in other pulse positions the memory storage means of each group remain unchanged, a signalling unit for receiving and sending digit signals for each group of memory storage means, each of said signalling units comprising bistable circuits, means for feeding cyclically scanning pulses to said signalling units simultaneously with the pulse position of a respective memory group to activate said bistable circuits, thereby to open a path for digit signals into and out of said memory group respectively during the respective pulse position, a switch contact belonging to the respective unit and other switch contacts for controlling external devices with which the respective memory group has to be connected for digit transmission, means for producing contact operating pulses so as to close simultaneously one signalling unit contact and one of said other contacts in one of the pulse positions selected for connection with the respective external device, a test wire for each of the signalling units for marking by its state of potential the idle or busy condition of the respective unit, an integrating circuit fed by said position pulses and producing an idle marking potential on the respective test wire when the integrating circuit receives said position pulses, an inhibit circuit connected to said means for producing said switch contact operating pulses for blocking the idle marking potential of the respective test wire in response to receiving said contact operating pulses, said inhibit circuit being also connected to each of said bistable circuits in the respective signalling unit for blocking the idle marking potential of said test wire in response to a not restored position of said binary circuits, and a restoring circuit for restoring all the circuits to rest position in the idle state of the respective signalling unit and for discontinuing said restoring function upon receiving a contact operating pulse.

References Cited by the Examiner

UNITED STATES PATENTS

| | | | |
|---|---|---|---|
| 2,738,382 | 3/56 | Brooks | 179—7 |
| 2,782,256 | 2/57 | Malthaner | 179—7 |

ROBERT H. ROSE, *Primary Examiner.*

THOMAS B. HABECKER, *Examiner.*